United States Patent
Sreshta et al.

(10) Patent No.: US 9,309,767 B2
(45) Date of Patent: Apr. 12, 2016

(54) REINFORCED STATORS AND FABRICATION METHODS

(75) Inventors: Harold A. Sreshta, Conroe, TX (US); Jiinjen Albert Sue, The Woodlands, TX (US); Stefan M. Butuc, The Woodlands, TX (US); Jan Edgar Marshall, Conroe, TX (US)

(73) Assignee: NATIONAL OILWELL VARCO, L.P., Houston, TX (US)

(*) Notice: Subject to any disclaimer, the term of this patent is extended or adjusted under 35 U.S.C. 154(b) by 239 days.

(21) Appl. No.: 13/817,032

(22) PCT Filed: Aug. 15, 2011

(86) PCT No.: PCT/US2011/047745
§ 371 (c)(1),
(2), (4) Date: Feb. 14, 2013

(87) PCT Pub. No.: WO2012/024215
PCT Pub. Date: Feb. 23, 2012

(65) Prior Publication Data
US 2013/0149182 A1 Jun. 13, 2013

Related U.S. Application Data

(60) Provisional application No. 61/373,960, filed on Aug. 16, 2010.

(51) Int. Cl.
F01C 21/00 (2006.01)
F01C 1/22 (2006.01)
F04C 2/107 (2006.01)

(52) U.S. Cl.
CPC ............... *F01C 1/22* (2013.01); *F04C 2/1075* (2013.01); *Y10T 29/49826* (2015.01)

(58) Field of Classification Search
CPC ........ F04C 2/1073; F04C 2/1075; F04C 5/00; F04C 2230/00; F04C 2230/22; F04C 2230/23; F04C 2230/60; F04C 2240/10; F04C 2240/802; F01C 1/22; Y02T 10/49826
USPC ........................ 418/1, 48, 152–153, 178–179
See application file for complete search history.

(56) References Cited

U.S. PATENT DOCUMENTS 3,268,997 A * 8/1966 Miller .............................. 419/27
5,171,139 A * 12/1992 Underwood et al. ........... 418/48
(Continued)

FOREIGN PATENT DOCUMENTS

| JP | 2005538289 A | 12/2005 |
|----|----|----|
| KR | 20000005327 A | 1/2000 |
| WO | 99/31389 A2 | 6/1999 |

OTHER PUBLICATIONS

PCT/US2011/047745 International Search Report and Written Opinion dated Mar. 23, 2012 (11 p.).

*Primary Examiner* — Jorge Pereiro
*Assistant Examiner* — Jason T Newton
(74) *Attorney, Agent, or Firm* — Conley Rose, P.C.

(57) ABSTRACT

A stator for a progressive cavity pump or motor comprises a tubular housing having a central axis. In addition, the stator comprises a stator insert coaxially disposed within the housing. The stator insert has a radially outer surface that engages the housing and a radially inner surface defining a helical-shaped through bore extending axially through the stator insert. The stator insert includes an insert body and an insert liner attached to the insert body. The insert body is radially positioned between the housing and the insert liner. The insert body comprises a reinforcement structure and a plurality of voids dispersed within the reinforcement structure.

27 Claims, 9 Drawing Sheets

(56) References Cited

U.S. PATENT DOCUMENTS

| | | | | |
|---|---|---|---|---|
| 5,474,432 | A * | 12/1995 | Hulley et al. | 418/48 |
| 5,722,820 | A | 3/1998 | Wild et al. | |
| 5,745,834 | A * | 4/1998 | Bampton et al. | 419/37 |
| 5,832,604 | A | 11/1998 | Johnson et al. | |
| 6,027,324 | A * | 2/2000 | Hull | 425/174.4 |
| 6,102,681 | A * | 8/2000 | Turner | 418/48 |
| 6,309,195 | B1 | 10/2001 | Bottos et al. | |
| 6,544,015 | B1 | 4/2003 | Kaechele | |
| 6,568,076 | B2 | 5/2003 | Bottos et al. | |
| 6,666,668 | B1 | 12/2003 | Kaechele | |
| 6,713,008 | B1 | 3/2004 | Teeter | |
| 6,872,061 | B2 | 3/2005 | Lemay et al. | |
| 7,083,401 | B2 | 8/2006 | Hooper | |
| 7,316,548 | B2 | 1/2008 | Jager | |
| 7,396,220 | B2 | 7/2008 | Delpassand et al. | |
| 7,407,372 | B2 * | 8/2008 | Guidry et al. | 418/48 |
| 7,442,019 | B2 | 10/2008 | Kaiser et al. | |
| 7,517,202 | B2 | 4/2009 | Delpassand | |
| 7,833,004 | B2 * | 11/2010 | Gilg | 425/441 |
| 8,033,802 | B2 | 10/2011 | Tekneyan et al. | |
| 2002/0070481 | A1 * | 6/2002 | Hernandez | 264/313 |
| 2003/0003000 | A1 * | 1/2003 | Shepherd et al. | 417/410.3 |
| 2005/0089429 | A1 | 4/2005 | Delpassand et al. | |
| 2006/0029507 | A1 * | 2/2006 | Kaiser et al. | 418/48 |
| 2006/0182643 | A1 * | 8/2006 | Delpassand et al. | 418/45 |
| 2008/0025859 | A1 | 1/2008 | Lee et al. | |
| 2008/0036112 | A1 * | 2/2008 | Gilg | 264/138 |
| 2008/0114339 | A1 * | 5/2008 | McBride et al. | 604/891.1 |
| 2008/0176092 | A1 * | 7/2008 | Owens | 428/542.8 |
| 2008/0304991 | A1 * | 12/2008 | Speckert | 418/48 |
| 2008/0304992 | A1 * | 12/2008 | Hooper et al. | 418/48 |
| 2009/0169364 | A1 * | 7/2009 | Downton | 415/118 |
| 2010/0098569 | A1 | 4/2010 | Robisson et al. | |
| 2010/0129170 | A1 | 5/2010 | Wilmot | |
| 2011/0150685 | A1 * | 6/2011 | Wilbourn et al. | 418/48 |
| 2011/0271527 | A1 * | 11/2011 | Lee et al. | 29/888.02 |
| 2012/0148432 | A1 * | 6/2012 | Butuc et al. | 418/48 |

\* cited by examiner

US 9,309,767 B2

REINFORCED STATORS AND FABRICATION METHODS

CROSS-REFERENCE TO RELATED APPLICATIONS

This application is a 35 U.S.C. §371 national stage application of PCT/US2011/047745 filed Aug. 15, 2011, which claims the benefit of U.S. provisional patent application Ser. No. 61/373,960 filed Aug. 16, 2010, and entitled "Reinforced Stators and Fabrication Methods," each of which is hereby incorporated herein by reference in its entirety.

BACKGROUND

1. Field of the Invention

The invention relates generally to pumps and motors that have a rotor rotatably disposed within a stator. More particularly, the invention relates to reinforced stators for pumps and motors and methods of fabricating the same.

2. Background of the Technology

A progressive cavity pump (PC pump), also know as a "Moineau" pump, transfers fluid by means of a sequence of discrete cavities that move through the pump as a rotor is turned within a stator. Transfer of fluid in this manner results in a volumetric flow rate proportional to the rotational speed of the rotor relative to the stator, as well as relatively low levels of shearing applied to the fluid. Consequently, progressive cavity pumps are typically used in fluid metering and pumping of viscous or shear sensitive fluids, particularly in downhole operations for the recovery of hydrocarbons. A PC pump may be operated in reverse and functioned as a positive displacement motor (PD motor) to convert the hydraulic energy of a high pressure fluid into mechanical energy in the form of speed and torque output, which may be harnessed for a variety of applications, including downhole drilling.

As shown in FIGS. 1 and 2, a conventional PC pump 10 includes a helical-shaped rotor 30, typically made of steel that may be chrome-plated or coated for wear and corrosion resistance, disposed within a stator 20, typically a heat-treated steel tube or housing 25 lined with an elastomeric stator insert 21 having a helical-shaped through bore. Specifically, stator insert 21 is bonded to the inner surface of stator housing 25 with a bonding agent such that insert 21 does not move relative to housing 25. Alternatively, for thin-walled liners, the stator housing has a helical-shaped inner surface and the stator liner disposed within the housing has a uniform radial thickness elastomeric layer or coating bonded to the inner surface of the stator housing.

The helical-shaped rotor 30 defines a set of rotor lobes 37 that intermesh via interference fit with a set of stator lobes 27 defined by the helical-shaped insert 21. As best shown in FIG. 2, the rotor 30 typically has one fewer lobe 37 than the stator 20. When the rotor 30 and the stator 20 are assembled, a series of cavities 40 are formed between the radially outer surface 33 of the rotor 30 and the radially inner surface 23 of the stator 20. Each cavity 40 is sealed from adjacent cavities 40 by seals formed along contact lines between the rotor 30 and the stator 20. The central axis 38 of the rotor 30 is parallel to and radially offset from the central axis 28 of the stator 20 by a fixed value known as the "eccentricity" of the PC pump.

During operation of the PC pump 10, the application of torque to rotor 30 causes rotor 30 to rotate within stator 20, resulting in fluid flow through the length of PC pump 10. In particular, circumferentially adjacent cavities 40 are opened and filled with fluid as rotor 30 rotates relative to stator 20. As this rotation and filling process repeats in a continuous manner, fluid flows progressively down the length of PC pump 10.

Since PC pumps and motors have few components, they can be made with a relatively small diameter sufficient for use in downhole applications. Another advantage of PC pumps and motors is that the fluid flowing through the PC pump or motor can contain some solid particles without risking damage to the pump or motor. For example, drilling mud that is used to cool and lubricate the drill bit and to raise cuttings to the surface may be used as the drive fluid for a PC motor.

Conventional PC pumps and motors can reach operating temperatures up to 300° C. or more depending on the ambient temperature and its operating efficiency. The operating temperature of a PC pump or motor is a function of various factors including frictional engagement between the stator and the rotor and cyclical deflections of the elastomeric lobes of the stator liner, which are due, at least in part, to the interference fit with the rotor and associated reactive torque. The cyclic deflections and frictional engagement of the rotor and stator are known to cause increases in the operating temperature of the stator insert. Although some of the thermal energy generated in the stator insert is carried off by the fluid medium flowing through the PC pump or motor (e.g., drilling mud), a substantially amount of thermal energy remains in the stator and can negatively impact performance of the PC pump or motor. In particular, most stator inserts are made from a synthetic elastomer or natural rubber compound that exhibits a relatively high coefficient of expansion. Thus, the thickness of the elastomeric stator insert can change considerably as a function of the operating temperature of the stator, which in turn, can alter the interference fit between the rotor and the stator. For example, the elastomeric material of the stator insert may expand to the extent that frictional losses due to engagement of the rotor and the stator begin to significantly reduce the efficiency of PC motor or pump. Even worse, in some cases, the elastomeric stator liner may expand to the extent that rotation of the rotor is completely inhibited. In addition, excessive frictional engagement between the rotor and the stator may strip away the liquid between the rotor and stator, potentially leading to a dry contact region and resulting damage to the elastomeric material.

Accordingly, there remains a need in the art for stator inserts for PC pumps and motors that offer the potential for improved thermal energy dissipation, reduced operating temperatures, and reduced frictional engagement with the rotor. Such improved stator inserts would be particularly well received if they were easily removed from the stator housing for service, maintenance, and replacement. Furthermore, it would desirable to spatially vary the radial thickness of the stator liner to minimize thermal degradation of the elastomer liner and spatially vary its stiffness to improve its performance.

BRIEF SUMMARY OF THE DISCLOSURE

These and other needs in the art are addressed in one embodiment by a stator for a progressive cavity pump or motor. In an embodiment, the stator comprises a tubular housing having a central axis. In addition, the stator comprises a stator insert coaxially disposed within the housing. The stator insert has a radially outer surface that engages the housing and a radially inner surface defining a helical-shaped through bore extending axially through the stator insert. The stator insert includes an insert body and an insert liner attached to the insert body. The insert body is radially positioned between the housing and the insert liner. The insert body comprises a reinforcement structure and a plurality of voids dispersed within the reinforcement structure.

These and other needs in the art are addressed in another embodiment by a method for assembling a stator for a progressive cavity pump or motor. In an embodiment, the method comprises (a) providing a tubular stator housing having a central axis and a radially inner surface. In addition, the method comprises (b) forming a stator insert body comprising a reinforcement structure and a plurality of voids in the reinforcement structure. Further, the method comprises (c) attaching an elastomeric insert liner to a radially inner surface of the insert body. Still further, the method comprises (d) positioning the insert body in the housing.

These and other needs in the art are addressed in another embodiment by a progressive cavity pump or motor. In an embodiment, the progressive cavity pump or motor comprises a stator having a central axis and including a tubular housing and a stator insert coaxially disposed within the housing. The stator insert includes an insert body and an insert liner attached to the insert body, the insert body being radially positioned between the housing and the insert liner. The insert body comprises a reinforcement structure defining a plurality of voids within the insert body. In addition, the progressive cavity pump or motor comprises a rotor rotatably disposed within a helical-shaped throughbore extending axially through the stator and defined by the insert liner.

Embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
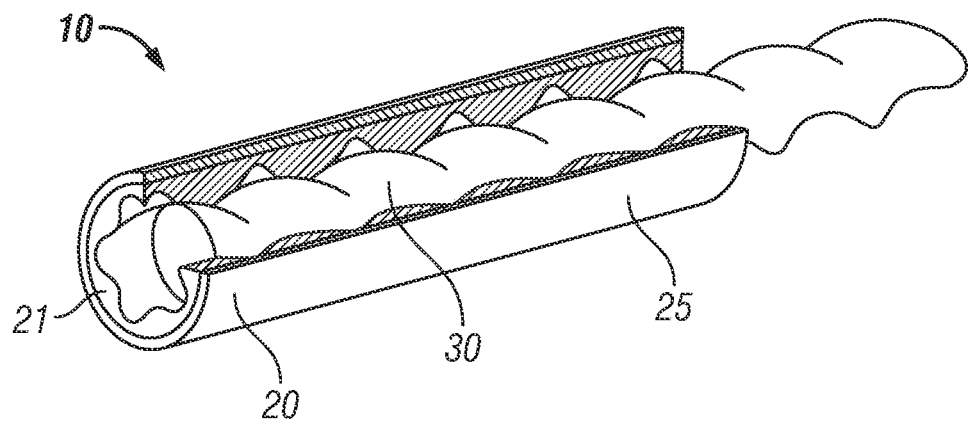
FIG. 1 is a perspective, partial cut-away view of a conventional progressive cavity pump.
Figure 2:
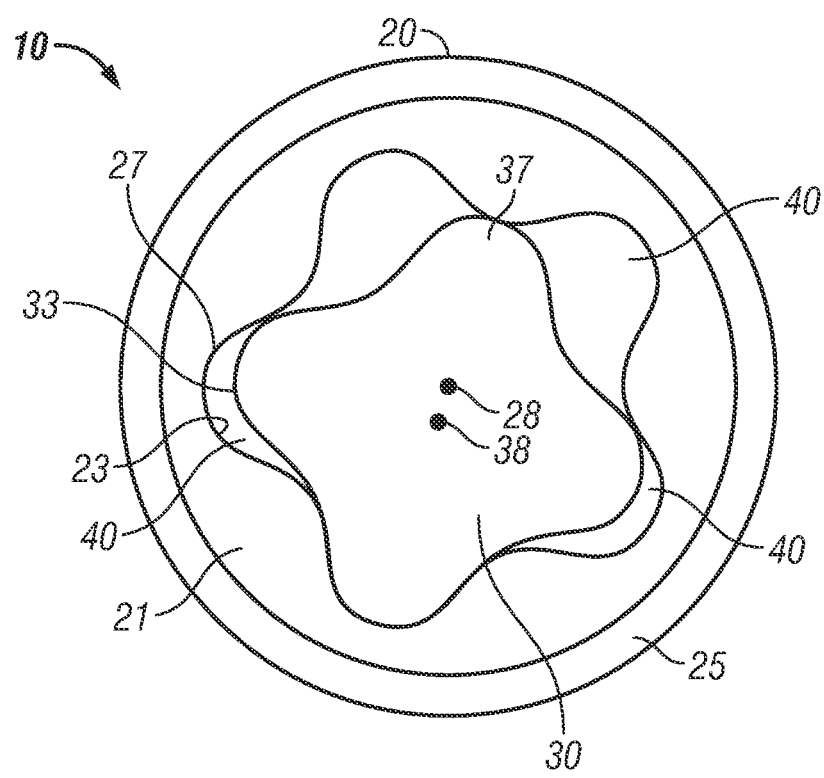
FIG. 2 is a cross-sectional end view of the progressive cavity pump of FIG. 1.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 3:
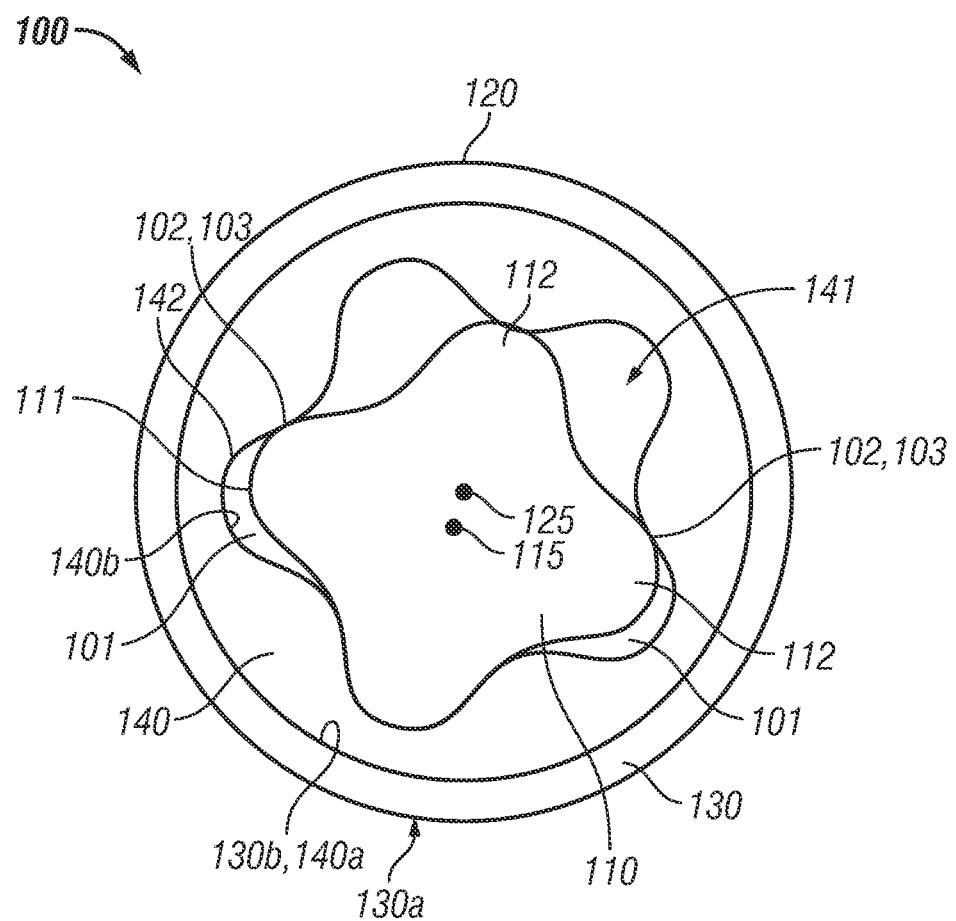
FIG. 3 is a cross-sectional end view of an embodiment of a progressive cavity pump or motor in accordance with the principles described herein.

Referring now to FIG. 3, an embodiment of a PC device 100, which may be employed as a PC pump or PC motor, is shown. In this embodiment, PC device 100 comprises a rotor 110 rotatably disposed within a stator 120. Rotor 110 has a central axis 115 and a radially outer helical-shaped surface 111 that defines a plurality of circumferentially-spaced rotor lobes 112. Rotor 130 is preferably made of steel or stainless steel and may be chrome-plated or coated for wear and corrosion resistance.

Figure 4:
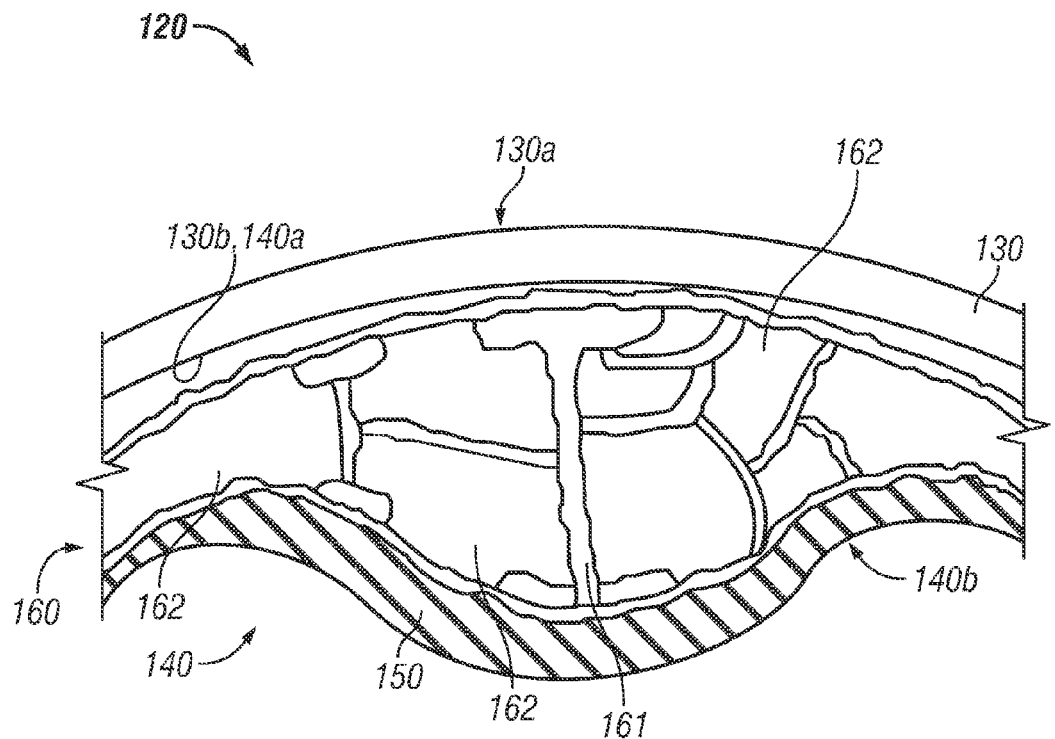
FIG. 4 is an enlarged partial cross-sectional view of the stator of FIG. 3.

Referring now to FIGS. 3 and 4, stator 120 has a central axis 125 and includes a stator housing 130 and a stator insert 140 coaxially disposed within housing 130. A helical-shaped throughbore 141 extends axially through stator insert 140 and defines a plurality of circumferentially-spaced stator lobes 142. In this embodiment, stator housing 130 is a tubular having a radially outer cylindrical surface 130*a* and a radially inner cylindrical surface 130*b*. Further, in this embodiment, stator insert 140 has a radially outer cylindrical surface 140*a* that engages housing inner surface 130*b*, and a radially inner helical-shaped surface 140*b* that defines stator bore 141 and lobes 142. Stator insert 140 is secured to housing 130 such that insert 140 does not move translationally or rotationally relative to housing 130. In particular, stator insert 140 may be bonded to housing 130 along the interface between surfaces 130*b*, 140*a*, or, as described in more detail below, stator insert 140 may be releasably, mechanically locked to housing 130. Stator housing 130 preferably comprises a rigid, durable, corrosion resistant material suitable for harsh downhole conditions including, without limitation, heat-treated steel and stainless steel.

As best shown in FIG. 3, rotor lobes 112 mate and intermesh with stator lobes 142 as rotor 110 rotates within stator 120 during downhole operations (e.g., pumping or drilling operations). In this embodiment, rotor 110 has one fewer lobe 112 than stator 120 (e.g., rotor 110 has four lobes 112 and stator 120 has five lobes 142). When the rotor 110 and stator 120 are assembled, a series of cavities 101 are formed between outer surface 111 of rotor 110 and inner surface 140b of stator 120. Each cavity 101 is sealed from the circumferentially adjacent cavities 101 by seals 102 formed along contact lines 103 between rotor 110 and stator insert 140. The central axis 115 of rotor 110 is parallel to and radially offset from central axis 125 of stator 120 by a fixed value known as the "eccentricity" of PC device 100.

Referring now to FIG. 4, stator insert 140 comprises an insert liner 150 and an insert body 160 extending radially between insert liner 150 and housing 130. Insert body 160 defines outer surface 140a of stator insert 140 and insert liner 150 defines inner surface 140b of stator insert 140. In this embodiment, insert liner 150 is a uniform radial thickness elastomeric liner bonded to the radially inner surface of insert body 160.

Insert body 160 comprises a reinforcement structure 161 that extends radially between insert liner 150 and housing 130. Structure 161 defines a plurality of voids 162 dispersed throughout reinforcement structure 161 and insert body 160. Specifically, reinforcement structure 161 extends between and around voids 162. Each void 162 may be isolated from one or more other voids 162 or in fluid communication with one or more other voids 162, each void 162 preferably having a volume greater than $0.1 \text{ cm}^3$. In addition, voids 162 may be filled with a filler material or substance (e.g., gas, liquid, or solid) or completely evacuated (e.g., subjected to a vacuum).

Inclusion of voids 162 within insert body 160 enables the adjustment and control of the mechanical properties (e.g., rigidity, strength, thermal conductivity, etc.) of insert body 160 to tailor stator insert 140 for specific applications. In particular, the content, pressure, and total volume of voids 162 may be adjusted to control and tailor the mechanical properties of insert body 160. Without being limited by this or any particular theory, the density of the contents of voids 162 is directly related to the radial stiffness of insert body 160 and stator insert 140. Thus, the greater the density of the contents within voids 162 increases, the greater the stiffness of insert body 160 and stator insert 140; and as the lower the density of the contents within voids 162, the lower the stiffness of insert body 160 and stator insert 140. Accordingly, by varying the contents within voids 162, the stiffness of insert body 160 and stator insert 140 may be adjusted, as desired, for a particular application. Further, without being limited by this or any particular theory, the pressure in voids 162 is directly related to the radial stiffness of insert body 160 and stator insert 140. Thus, the greater the pressure within voids 162, the greater the stiffness of insert body 160 and stator insert 140; and the lower the pressure within voids 162, the lower the stiffness of insert body 160 and stator insert 140. Accordingly, by varying the pressure in voids 162, the stiffness of insert body 160 and stator insert 140 may be adjusted, as desired, for a particular application. Still further, without being limited by this or any particular theory, the total volume of voids 162 as a percentage of the total volume of insert body 160 is inversely related to the stiffness of insert body 160 and stator insert 140. Thus, the greater the volume of voids 162 as a percentage of the overall volume of insert body 160, the lower the stiffness of reinforcement structure 161 and insert body 160; and the lower the volume of voids 162 as a percentage of the overall volume of insert body 160, the lower the stiffness of reinforcement structure 161 and insert body 160. For example, voids 162 may be of minimal total volume (e.g., the total volume of all voids 162 represents 1-5% of the volume of insert body 160), such that insert body 160 is essentially solid (i.e., substantially all reinforcement structure 161); alternatively, voids 162 may be of substantial volume (e.g., the total volume of all voids 162 represents 75-90% of the volume of insert body 160), such that insert body 160 is substantially hollow. Accordingly, by varying the volume of voids 162, the stiffness of insert body 160 may be adjusted, as desired, for a particular application. In general, the total volume of all voids 162 will depend on a variety of factors including, without limitation, the material of reinforcement structure 161, the diameter of PC device 100, the number of lobes 142, the radial thickness of insert liner 150, the structural integrity of reinforcement structure 161 to withstand anticipated mechanical and thermal loads, or combinations thereof. For a metal or metal alloy reinforcement structure 161, the total volume of all voids 162 is preferably between 75-90% of the volume of insert body 160, and for a polymeric or plastic reinforcement structure, the total volume of all voids 162 is preferably less than or equal to 60% of the volume of insert body 160. Larger total void volumes may be achieved by filling voids 162 with a secondary material (e.g., liquid or solid).

In the embodiment shown in FIG. 4, reinforcing structure 161 is formed into a skeletal web lattice that defines voids 162. However, in general, the reinforcement structure (e.g., reinforcement structure 161) may be formed from other arrangements or structures that include or define a plurality of spaced apart voids (e.g., voids 162) including, without limitation, a scaffolding structure, a latticework structure, a cellular structure, a geodesic structure or combinations thereof. Further, reinforcement structure 161 may be made from any suitable material(s) including, without limitation, steel (e.g., stainless steel, carbon steel, tool steel, and other steel alloys); superalloy(s); tin, copper, aluminum, cobalt, nickel, titanium, or alloys thereof; graphite; polymer reinforced composite; rubber or other elastomeric material; polymeric material; or combinations thereof. For most applications, reinforcement structure 161 is preferably made from stainless steel. However, in embodiments where insert body 160 is designed for single-use (i.e., the insert body will be disposed after one downhole use), reinforcement structure 161 is preferably made from a lower cost polymeric or plastic material. Reinforcement structure 161 may be constructed in a variety of ways including, without limitation, bonding or welding aggregate materials together in the shape of the insert body (e.g., insert body 160), stereolithography (STL) methods, formed from stainless steel by laser printing (e.g., direct metal laser sintering (DMLS)), formed from a curable resin by laser induced curing, or cast using cores and molds according to conventional casting processes.

As previously described, each void 162 may be filled or occupied by any suitable filler material including, without limitation, gases, liquids, solids, or combinations thereof. However, each void 162 is preferably filled with air, nitrogen, water, a gelatinous substance (e.g., a polymer gel substance), metallic shavings, powders (e.g., ceramic powders, oxide powders; nitrite powders), fiberous materials, graphite, silicon carbide, silicon nitrite, an aggregate material, a dampening agent, or combinations thereof. Aggregate fill materials preferably comprise sand, rock, steel, iron, copper, zinc, brass, bronze, aluminum, magnesium, nickel, cobalt, tungsten, chrome, and ceramic materials, or combinations thereof. For aggregate fill materials, the aggregate may be selected from any desired size and shape to optimally fill voids 162. For example, the aggregate may include particles having shapes selected from the group of spherical, discoidal, tubular, ellipsoidal, equant, cylindrical, or combinations thereof.

Figure 5:
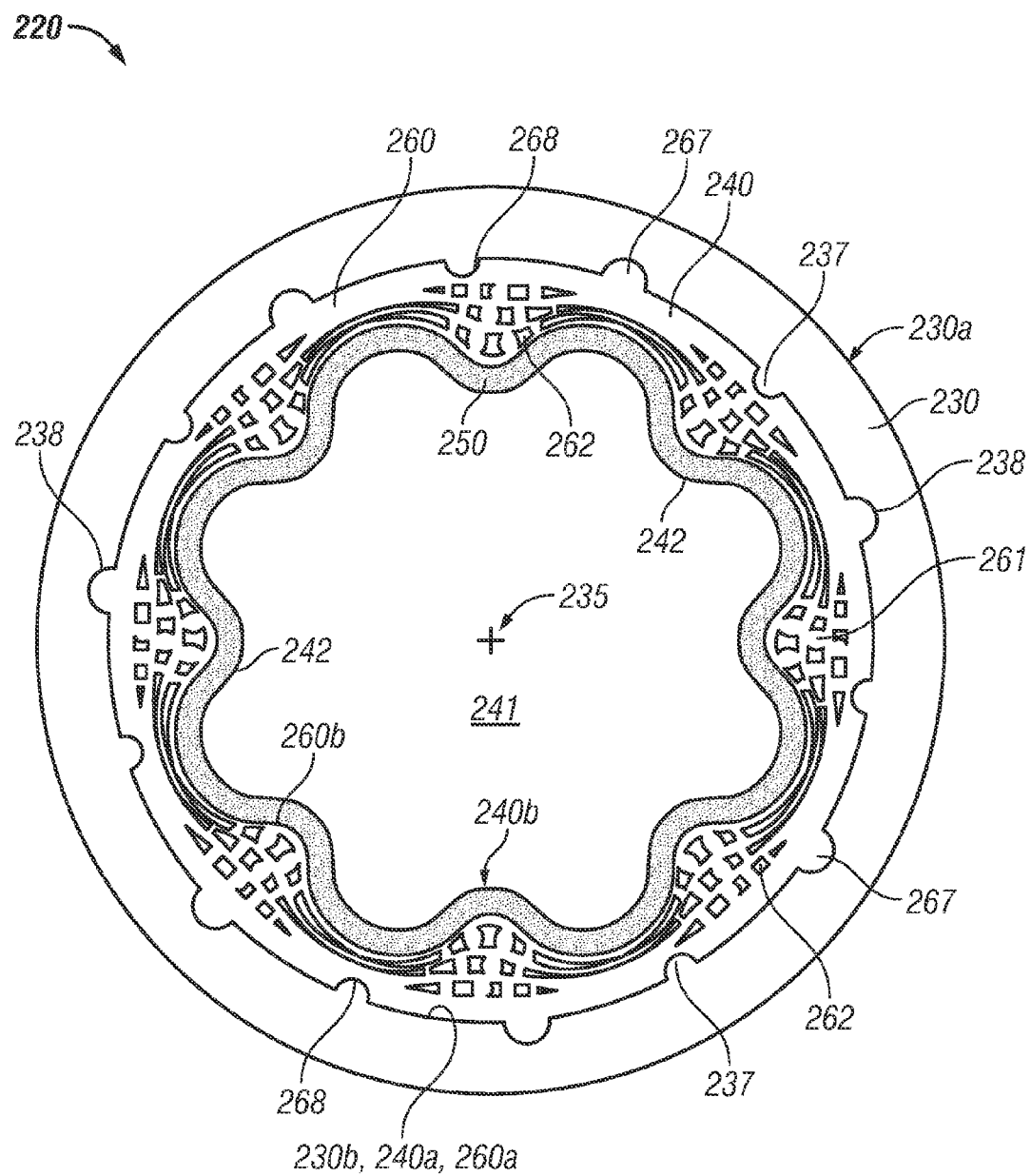
FIG. 5 is a cross-sectional end view of an embodiment of a stator for a PC pump or motor in accordance with the principles described herein.

Referring now to FIG. 5, a cross-sectional end view of an embodiment of a stator 220 that may be employed in a PC device (e.g., PC pump or PC motor) is shown. For example, stator 220 may be substituted for stator 120 in PC device 10 previously described. Stator 220 includes a stator housing 230 and a stator insert 240 coaxially disposed within housing 230. A helical-shaped throughbore 241 extends axially through stator insert 240 and defines a plurality of circumferentially-spaced stator lobes 242 adapted to mate and intermesh with a rotor disposed therein. In this embodiment, stator housing 230 is a tubular having a central axis 235, a radially outer cylindrical surface 230a and a radially inner cylindrical surface 230b. Stator insert 240 has a radially outer cylindrical surface 240a that engages housing inner surface 230b, and a radially inner helical-shaped surface 240b that defines stator bore 241 and lobes 242. Stator insert 240 is secured to housing 230 such that insert 240 does not move translationally or rotationally relative to housing 230. In this embodiment, housing 230 includes a plurality of elongate, circumferentially-spaced splines 237 extending radially inward from surface 230b and a plurality of elongate, circumferentially-spaced grooves or recesses 238 extending radially outward from surface 230b. Splines 237 and grooves 238 are parallel, each extending axially along outer surface 230b. As will be described in more detail below, splines 237 and grooves 238 are sized and positioned to engage mating grooves and splines, respectively, of stator insert 240, thereby mechanically interlocking stator insert 240 to housing 230. Such mechanical interlock between insert 240 and housing 230 restricts and/or prevents insert 240 from rotating relative to housing 230 during downhole operations, and enables a bond-free coupling between insert 240 to be bonded to housing 230. Although insert 240 need not be bonded to housing 230, a bonding agent may be used to strengthen the connection between the stator insert (e.g., stator insert 240) and the housing (e.g., housing 230).

Figure 6:
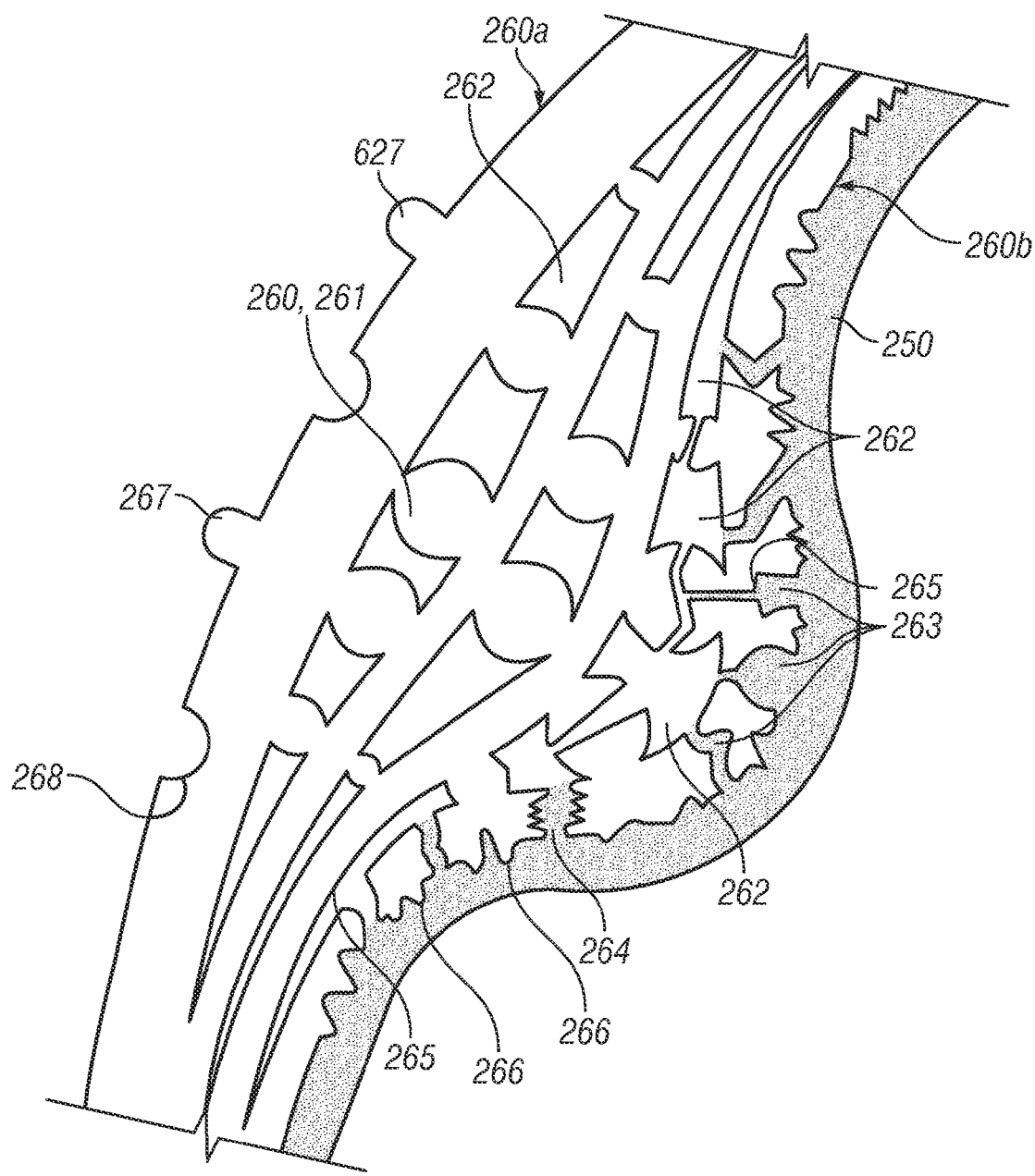
FIG. 6 is an enlarged partial cross-sectional view of the stator insert of FIG. 5.
Figure 7:
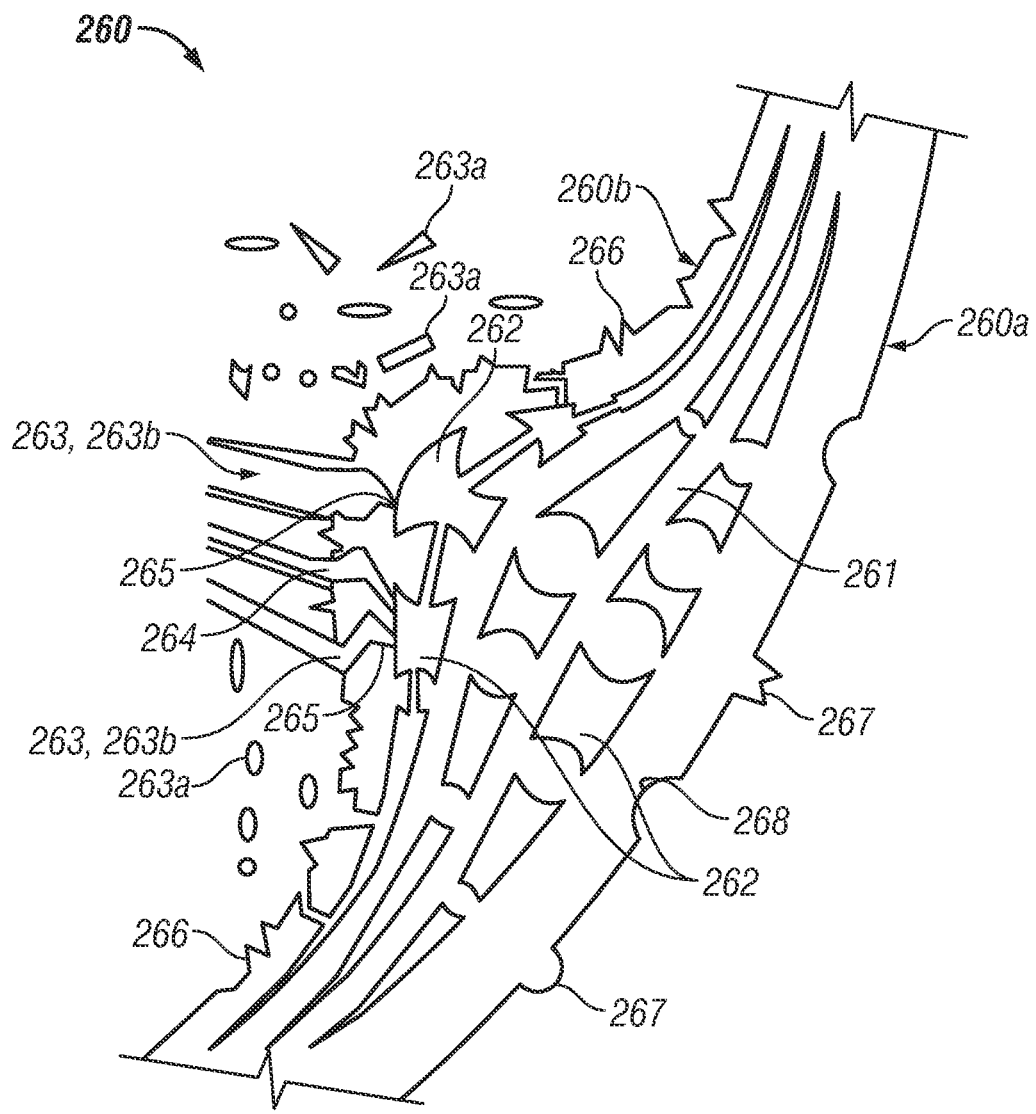
FIG. 7 is an enlarged partial cross-sectional view of the insert body of the stator insert of FIGS. 5 and 6.

Referring now to FIGS. 5-7, stator insert 240 comprises an insert liner 250 and an insert body 260 extending radially between insert liner 250 and housing 230. Insert body 260 defines outer surface 240a of stator insert 240 and insert liner 250 defines inner surface 240b of stator insert 240. Insert body 260 has a generally cylindrical radially outer surface 260a that engages inner surface 230b of stator housing 230, and a generally helical-shaped inner surface 260b. Insert liner 250 is attached to inner surface 260b of insert body 260.

Insert body 260 comprises a reinforcement structure 261 that extends radially between surfaces 260a, b. Thus, outer surface 260a of insert body 260 is also the radially outer surface of reinforcement structure 261, and inner surface 260b of insert body 260 is also the radially inner surface of reinforcement structure 261. Reinforcement structure 261 defines a plurality of spaced-apart voids 262 dispersed throughout reinforcement structure 261 and insert body 260. Specifically, reinforcement structure 261 extends between and around voids 262. In general, reinforcement structure 261 and voids 262 may be formed in the same manner as reinforcement structure 161 and voids 162, respectively, as previously described. Further, reinforcement structure 161 may be made from the same material(s) as reinforcement structure 161 previously described, and voids 262 may be filled with the same materials as voids 161 previously described. Moreover, it should be appreciated that the contents, pressure, and total volume of voids 262 may be varied in the same manner as voids 162 previously described to adjust and control the mechanical properties of insert body 260 for specific applications.

Referring now to FIGS. 6 and 7, in this embodiment, reinforcement structure 261, and hence insert body 260, includes a plurality of recesses 263 extending radially outward from inner surface 260b of insert body 260. Each recess 263 has an opening 264 disposed along inner surface 260b and a terminus 265 within insert body 260 and radially outward of inner surface 260b. Each recess 263 has a circumferential width and/or axial length that initially increases moving radially outward from its corresponding opening 264. Accordingly, recesses 263 may be described as "negative draft" recesses. Each opening 264 preferably has a circumferential width greater than 0.1 mm, and more preferably between 0.1 mm and 1.1 mm. The dimensions of recesses 263 may continue to increase moving radially outward to its corresponding terminus 265, or initially increase and then decrease moving radially outward to its corresponding terminus 265. As will be described in more detail below, negative draft recesses 263 enable positive engagement and enhance the mechanical lock between insert liner 250 and insert body 260 along inner surface 260b. Consequently, recesses 263 may also be described as "locking" features.

In this embodiment, negative draft recesses 263 extending from inner surface 260b include discrete, isolated negative draft recesses 263a and elongated, continuous negative draft recesses 263b. Isolated recesses 263a are scattered about inner surface 260b of insert body 260, and in this embodiment, are randomly spaced about inner surface 260b. However, in other embodiments, the discrete, isolated recesses (e.g., recesses 263a) may be uniformly spaced and/or arranged in a pattern about the inner surface of the insert body (e.g., inner surface 260b of insert body 260). In this embodiment, the continuous negative draft recesses 263b extend along the helical rifling of insert body 260, and thus, may be described as helical or spiraled recesses.

Referring still to FIGS. 6 and 7, terminus 265 of select negative draft locking features 263 are in fluid communication with voids 262 of reinforcement structure 261. Such terminus 265 may be gas and/or liquid permeable. Any fluid passages between a terminus 265 and void 262 allowing fluid communication therebetween is preferably sized (i.e., circumferential width and axial height) smaller than opening 264 of the same recess 263 to restrict and/or prevent the elastomeric material of liner 150 from flowing radially outward through the recess 263 into the void 262 during injection molding or transfer molding of liner 150. In other words, any openings in terminus 265 are preferably sized to restrict and/or prevent the elastomeric insert liner 150 from flowing into voids 262 during injection molding or transfer molding of the elastomeric insert liner 150.

In this embodiment, insert body 260 also includes a plurality of surface deviations or irregularities 266 along inner surface 260b. Deviations 266 include isolated notches and protrusions as well as valley and hill type grooving along inner surface 260b. Deviations 266 increase the contact surface area between the insert liner and insert body 260, thereby enhancing the mechanical lock and heat transfer between the insert liner and insert body 260. In addition, deviations 266 offer the potential to reduce thermal degradation of the insert liner in service and increase power section performance by enabling variations in the radial thickness of the liner moving along the liner in the circumferential and axial directions. The combination of reinforcement and elastomer liner allows for a 3 dimensional spatial variation of elastomer liner thickness to obtain a desired rotor-stator interference sufficient to effectively seal each cavity 101 and minimizes hysteresis loss during cyclic loading of the stator by the rotor in service. Without being limited by this or any particular theory, by minimizing the radial thickness of insert body 260, the heat-build up generated during the cyclic loading will also be minimized.

Referring again to FIGS. 6-8, in this embodiment, reinforcement structure 261, and hence insert body 260, also includes a plurality of circumferentially-spaced splines 267 extending radially outward from outer surface 260a of insert body 260 and a plurality of circumferentially-spaced grooves or recesses 268 extending radially inward from outer surface 260a of insert body 260. Splines 267 and grooves 268 are parallel, each extending axially along surface 260a. Splines 267 and grooves 268 secure and lock reinforcement structure 261 and insert body 260 to stator housing 230 by positively engaging mating grooves 238 and splines 237, respectively, on inner surface 230b of stator housing 230. Consequently, splines 267 and grooves 268 also function to restrict and/or prevent reinforcement structure 261, and hence insert body 260, from rotating relative to stator housing 230 during downhole operations.

As best shown in FIG. 6, portions of insert liner 250 extend into negative draft recesses 263 previously described, thereby securing and locking insert liner 250 to insert body 260 and enabling the option of a bond-free coupling therebetween. In other words, insert liner 250 may be attached to insert body 260 with or without a bonding agent. In addition, insert liner 250 engages surface perturbations 266 along inner surface 260b of insert body 260 and reinforcement structure 261. Perturbations 266 increase the contact surface area between insert liner 250 and insert body 260 and permit variation of the radial thickness of insert liner 250.

In general, insert liner 250 may comprise any suitable elastomeric material including, without limitation, a natural rubber, a synthetic elastomer, or combinations thereof. In embodiments where the filler material in voids 262 is an elastomeric material, the elastomeric material in voids 262 and elastomeric insert liner 250 may comprise the same or different elastomeric materials.

Some elastomeric materials exhibit a strong temperature profile (i.e., the coefficient of expansion is relatively high). As a result, the radial thickness of the elastomeric insert liner (e.g., insert liner 250) can change considerably as a function of temperature, which can alter the interference between the rotor and stator insert liner. In some cases, radial expansion of the elastomeric insert liner can result in increased friction losses and reduce PC pump/motor efficiency, and/or inhibit rotor rotation. However, embodiments described herein offer the potential to reduce the likelihood of these undesirable consequences of stator liner expansion. Specifically, the combination of the reinforcement structure (e.g., reinforcement structure 161, 261) and elastomer inert liner (e.g., insert liner 150, 250) allows for variation of radial thickness of the elastomer insert component of the insert body (e.g., insert body 160, 260) enabling reduced hysteresis loss during cyclic loading of the stator by the rotor in service. In particular, the insert body is configured such that elastomeric insert liner has an optimal thickness to provide adequate interference to seal cavity fluid and reduce thermal degradation damage via hysteresis in the elastomer liner. In light of the anticipated loads, the deformation and deflection of the insert body and insert liner attached thereto may be controlled by varying the thickness of the reinforcement structure and the thickness of the insert liner at each region of the insert body. This approach may be used to provide an even-walled or asymmetric thin-walled elastomeric insert liner.

Figure 8:
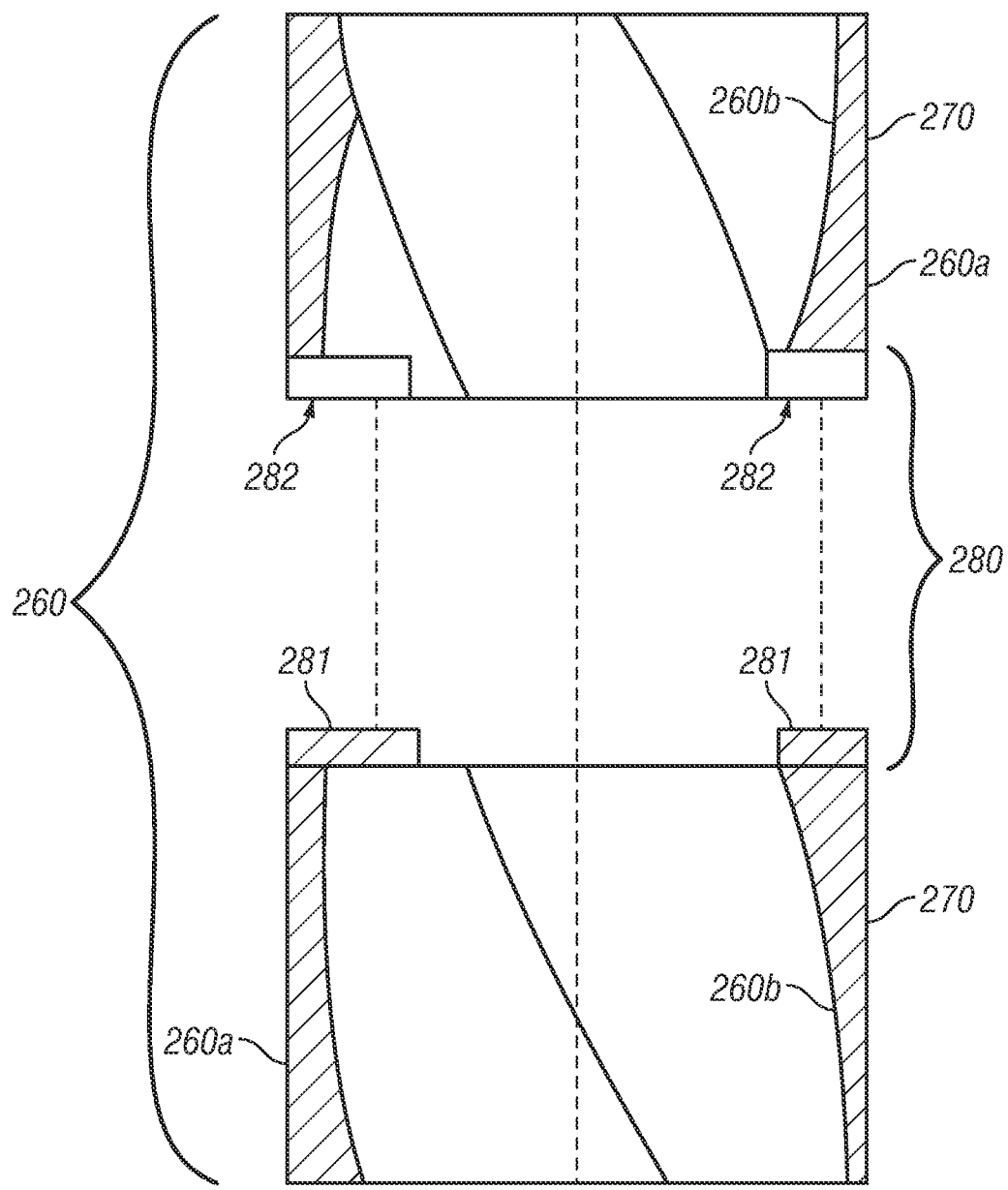
FIG. 8 is a cross-sectional assembly view of the insert body of FIG. 5.

Referring now to FIG. 8, the assembly of insert body 260 previously described is schematically shown. In this embodiment, insert body 260 comprises a plurality of insert body segments 270 that are coupled together end-to-end to form elongate insert body 260. Each insert body segment 270 is configured the same as insert body 260, except that each body segment 270 has an axial length less than the axial length of insert body 260.

In this embodiment, two insert body segments 270 are axially coupled end-to-end to with a locking assembly 280 comprising a plurality of circumferentially-spaced extensions 281 extending axially from the upper end of a first insert body segment 270, and a plurality of mating recesses 282 disposed in the lower end of a second insert body segment 270. To assemble insert body 260, body segments 270 are coaxially aligned and oriented such that each extension 281 of the first body segment 270 is aligned with one mating recess 282 of the second body segment 270. Next, body segments 270 are axially advanced together. With mating extensions 281 and recesses 282 aligned, segments 270 are axially urged together until extensions 281 are sufficiently seated in mating recesses 282. Although mating extensions 281 and recesses 282 are employed in this embodiment, in other embodiments, the two or more insert body segments (e.g., body segments 270) may be coupled by other suitable means including, without limitation, braces, welding, bonding, or combinations thereof to form the insert body (e.g., insert body 260). It should be appreciated that the modular design of insert body 260 including multiple body segments 270 allows insert body 260 to be built to have any desired axial length. For example, to increase the length of insert body 260, additional insert body segments 270 may be added. Further, such a modular approach to forming insert body 260 may be particularly useful in instances where the design parameters of insert body exceed the limits of STL manufacturing equipment and processes.

Following coupling of insert body segments 270 to form insert body 260, insert body 260 is installed into housing 230 by coaxially aligning insert body 260 and housing 230, aligning mating splines 237 and grooves 268, aligning mating splines 267 and grooves 238, and axially advancing insert body 260 into housing 230. As insert body 260 is axially inserted into housing 230 positive engagement of mating splines and grooves 237, 268 and mating splines and grooves 238, 267 secures insert body 260 to housing 230 and restricts and/or prevents insert body 260 from rotating relative to housing 230. In this manner, embodiments described herein offer the potential for relatively quick assembly of the stator insert body (e.g., insert body 260) by mechanically coupling the individual insert body segments (e.g., segments 270) together, and relatively quick integration of the stator insert body and housing (e.g., housing 230) by locking the stator insert into housing via engagement of a plurality of mating grooves and splines.

As previously described, insert body 260 is lined with elastomeric insert liner 250. In general, insert liner 250 may be installed into each body segment 270 prior to assembly of insert body 260, or insert liner 250 may be installed in insert body 260 after assembly of body segments 270. For example, after assembling body segments 270, insert body 260 may be lined with elastomeric insert liner 250. Alternatively, each body segment 270 may be independently lined with its own elastomeric insert liner 250 (e.g., via transfer moulding), and after the elastomer has sufficiently cured, body segments 270 may be coupled together to form insert body 260.

To line insert body 260 with elastomeric insert liner 250 to form stator insert 240, a core having the negative shape of the desired geometry for radially inner surface 240b is coaxially inserted into the insert body 260, and an elastomeric material is injected within the annulus radially disposed between the core and insert body 260 to form elastomeric insert liner 250. After the elastomeric material has cured, the core is removed, and the resulting stator insert 240 may then be installed into housing 230. The same general approach may also be used to line each body segment 270 in embodiments where body segments 270 are lined with elastomeric insert liner 250 prior to assembly of insert body 260. For example, the elastomeric material may be injected in each body segment 270 by using corresponding cores for each segment 270.

As previously described, perturbations 266 and negative draft locking features 263 enhance the engagement of insert liner 250 and insert body 260, thereby reducing and/or eliminating the need for a bonding agent between liner 250 and body 260. However, if desired, a bonding agent may be used to further strengthen the connection between liner 250 and body 260. In such cases, prior to injecting the elastomer, inner surface 260b of insert body 260 is coated with a bonding agent. Although elastomeric inert liner 250 has been described as being injection molded into stator body 260, in generally, the stator body (e.g., stator body 260) may be lined with the elastomeric liner (e.g., liner 250) by any suitable means including, without limitation, transfer molding, injection molding, or other molding technique.

Figure 9:
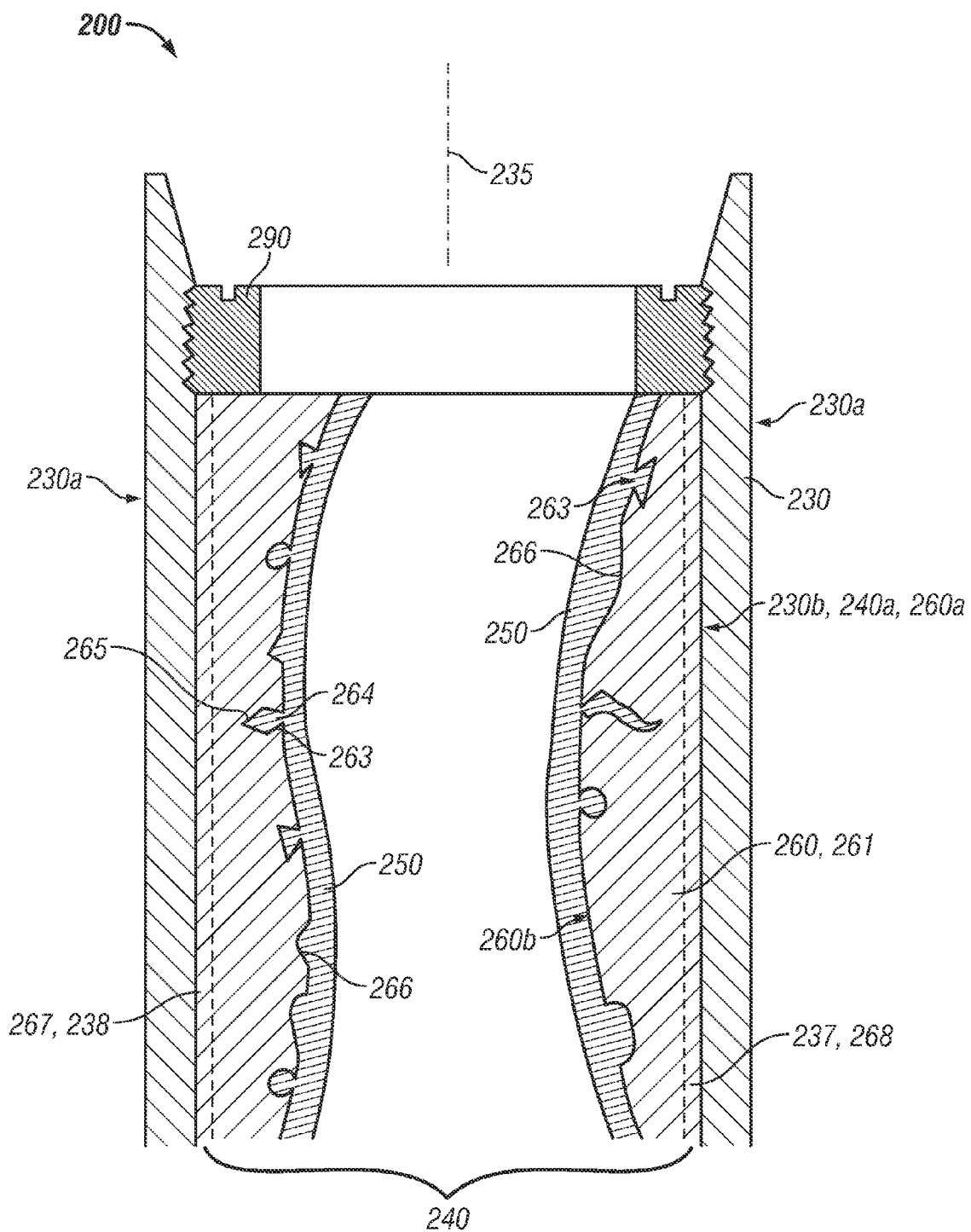
FIG. 9 is an enlarged partial cross-sectional side view of the stator of FIG. 5.

Referring now to FIG. 9, after insert body 260 is sufficiently positioned within housing 230 and has been lined with liner 250 to form stator insert 240 previously described, end caps 290 are threaded into the upper and lower ends of housing 230 until end caps 290 axially abut the upper and lower ends of stator insert 240, thereby restricting and/or preventing stator insert 240 from moving axially relative to housing 230 once disposed therein. Although end caps 290 are shown and described as being annular or ring-shaped structures that threadingly engage housing 230, in other embodiments, different mechanical locking systems may be employed to axially lock the stator insert (e.g., stator insert 240) within the housing (e.g., housing 230).

Embodiments of stators described herein offer the potential to reduce stator repair and servicing downtime. For example, to remove a used or damaged elastomeric insert liner (e.g., insert liner 250) from the insert body (e.g., insert body 260) so that a new elastomeric liner can be applied, the voids (e.g., voids 262) adjacent the elastomeric insert liner may be pressurized to impart pressure on the elastomer insert liner and separate the elastomer insert liner from the insert body. As another example, interconnected voids in the insert body may be used to transmit liquids or gases to the insert body-insert liner interface to separate the insert liner from the insert body, such as through thermal means, by either heating or cooling the insert liner, or alternately, a solvent type material that would degrade the insert liner where it contacts the inset body. As still yet another example, since embodiments described herein may eliminate the need to bond the stator insert (e.g., stator insert 240) and the stator housing (e.g., housing 230), a damaged stator insert, or less than ideal stator insert for a specific application, may be removed from the housing and replaced with a new stator insert. This may be accomplished in the field.

Figure 10:
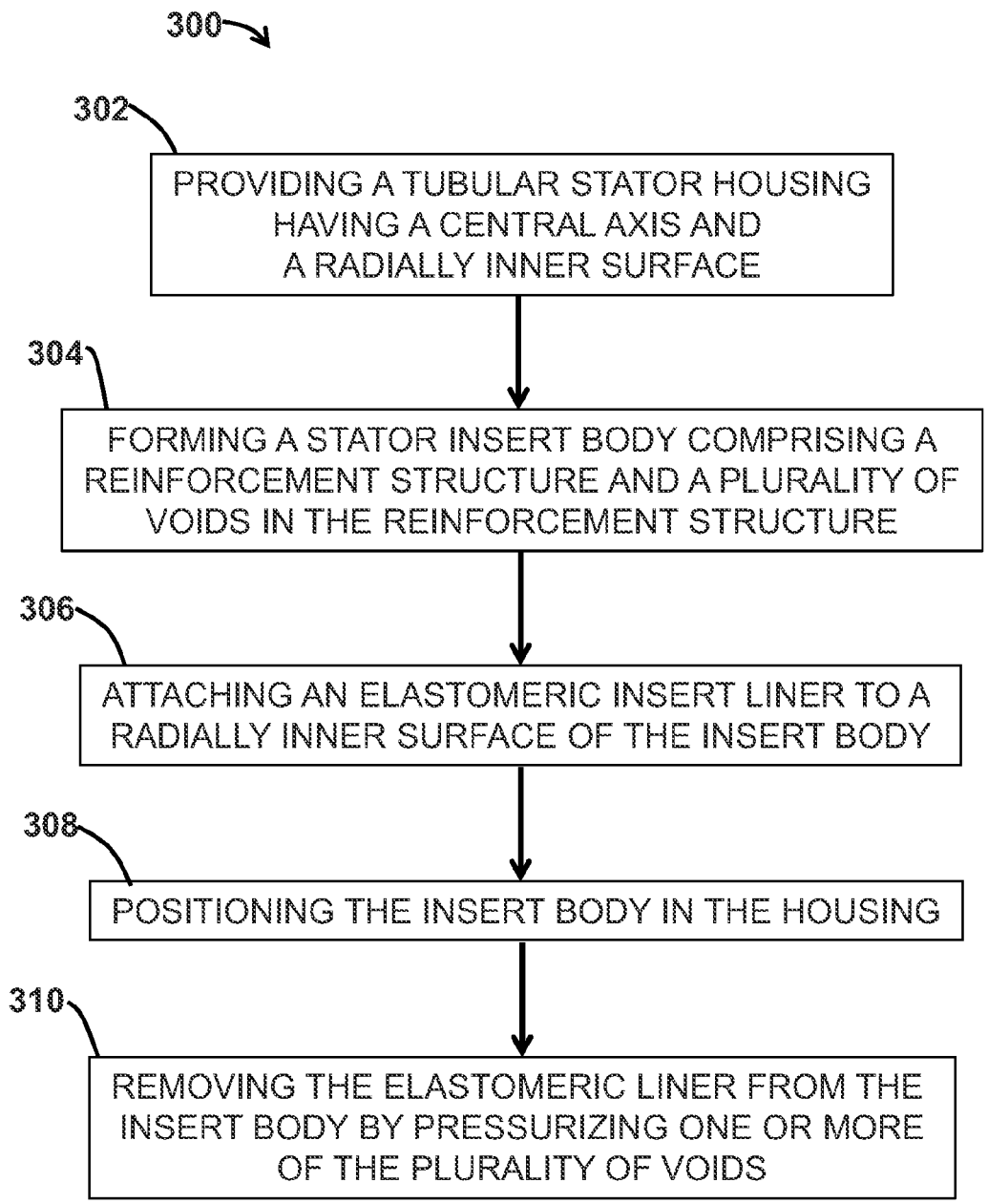
FIG. 10 is a flow chart illustrating an embodiment of a method for assembling a stator for a progressive cavity pump or motor and then repairing or servicing the assembled stator.

Referring to FIG. 10, an embodiment of a method 300 for assembling a stator for a progressive cavity pump or motor is shown in FIG. 10. Starting at block 302, a tubular stator housing having a central axis and a radially inner surface is provided. For instance, FIGS. 3 and 4 illustrate stator housing 130 having a radially inner cylindrical surface 130b. At block 304, a stator insert body comprising a reinforcement structure and a plurality of voids in the reinforcement structure is formed. For example, FIG. 4 illustrates insert body 160 comprising reinforcement structure 161 that defines the plurality of voids 162 dispersed through reinforcement structure 161. In some embodiments, block 304 comprises coupling a plurality of insert body segments together end-to-end to form the insert body. In other embodiments, block 304 comprises forming the reinforcement structure by a stereolithography method. In further embodiments, block 304 comprises forming the reinforcement structure by direct metal laser sintering.

At block 306, an elastomeric insert liner is attached to a radially inner surface of the insert body. For example, FIGS. 5 and 6 illustrate stator insert 240 comprising insert liner 250, where insert liner 250 is attached to the inner surface 260b of insert body 260. In some embodiments, block 306 comprises attaching an elastomeric insert liner to the insert body after coupling the plurality of insert body segments together. In other embodiments, block 306 comprises: positioning a core in a through bore in the insert body; injecting an elastomeric material into an annulus formed radially between the insert body and the core; allowing the elastomeric material to cure; and removing the core from the through bore in the insert body. In further embodiments, block 306 comprises positively engaging a plurality of negative draft recesses on a radially inner surface of the insert body with the insert liner. At block 308, the insert body is positioned in the housing. At block 310, the elastomeric liner is removed from the insert body by pressurizing one or more of the plurality of voids of the insert body. For instance, as shown in FIG. 6, the voids 262 of insert body 260 may be pressurized to impart pressure on the elastomer liner and separate the elastomer insert liner from the insert body. In some embodiments, method 300 also comprises positively engaging a plurality of splines on a radially outer surface of the insert body with a plurality of mating grooves on the radially inner surface of the housing.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A stator for a progressive cavity pump or motor, comprising:
   a tubular housing having a central axis;
   a stator insert coaxially disposed within the housing, wherein the stator insert has a radially outer surface that engages the housing and a radially inner surface defining a helical-shaped through bore extending axially through the stator insert;
   wherein the stator insert includes an insert body and an insert liner attached to the insert body, wherein the insert body is radially positioned between the housing and the insert liner;
   wherein the insert body comprises a monolithic reinforcement structure and a plurality of voids dispersed within the reinforcement structure;
   wherein the reinforcement structure comprises a plurality of negative draft recesses extending radially outward from a radially inner surface of the reinforcement structure, and wherein each negative draft recess has a circumferential width that increases moving radially outward from the radially inner surface of the reinforcement structure;
wherein the insert liner extends radially into each of the plurality of negative draft recesses on the radially inner surface of the reinforcement structure.

2. The stator of claim 1, wherein the reinforcement structure is selected from the group consisting of a scaffolding structure, a skeletal web structure, a latticework structure, a geodesic structure, and a cellular structure.

3. The stator of claim 2, wherein the reinforcement structure comprises a material selected from the group consisting of: stainless steel, carbon steel, tool steel, and other steel alloys; superalloy; tin, copper, aluminum, cobalt, nickel, titanium, and alloys thereof; carbon graphite plastics; polymer reinforced composite; rubber or other elastomeric component; polymeric material; plastics; and combinations thereof.

4. The stator of claim 3, wherein the reinforcement structure is formed from stainless steel by a stereolithography (STL) method or direct metal laser sintering (DMLS).

5. The stator of claim 1, wherein each of the negative draft recesses extends axially along the radially inner surface of the reinforcement structure.

6. The stator of claim 1, wherein each negative draft recess has an opening at the radially inner surface of the reinforcement structure and a terminus distal the radially inner surface of the reinforcement structure, and
wherein the terminus of at least one negative draft recess is in fluid communication with at least one of the plurality of voids.

7. The stator of claim 1, wherein the radially inner surface of the reinforcement structure further comprises at least one perturbation that engages the insert liner.

8. The stator of claim 1, wherein the reinforcement structure has a radially outer cylindrical surface that engages the housing;
wherein the reinforcement structure includes a plurality of circumferentially-spaced splines extending radially outward from the outer surface of the reinforcement structure;
wherein each spline of the reinforcement structure extends radially into a mating elongate groove in a radially inner surface of the housing; and
wherein positive engagement of the splines of the reinforcing structure and the grooves of the housing are configured to restrict the reinforcement structure from rotating relative to the housing.

9. The stator of claim 1, wherein the housing has a radially inner cylindrical surface that engages the reinforcement structure;
wherein the housing includes a plurality of circumferentially-spaced splines extending radially inward from the radially inner surface of the housing;
wherein each spline of the housing extends radially into a mating elongate groove in a radially outer surface of the reinforcement structure;
wherein positive engagement of the splines of the housing and the grooves of the reinforcement structure are configured to restrict the reinforcement structure from rotation relative to the housing.

10. The stator of claim 1, wherein the insert liner is attached to the reinforcement structure with a bonding agent.

11. The stator of claim 1, wherein at least one of the voids is filled with a filler material selected from the group consisting of: air; nitrogen; water; a gelatinous substance (e.g., a polymer gel substance); metallic shavings, powders, fibers, and/or whiskers; ceramic powders; oxide powders; nitrite powders; graphite; silicon carbide; silicon nitrite; an aggregate; any dampening agent; and combinations thereof.

12. The stator of claim 11, wherein at least one of the voids is filled with an aggregate material selected from the group consisting of sand, rock, steel, iron, copper, zinc, brass, bronze, aluminum, magnesium, nickel, cobalt, tungsten, chrome, and ceramic materials and combinations thereof.

13. A method for assembling a stator for a progressive cavity pump or motor and then repairing or servicing the assembled stator, the method comprising:
(a) providing a tubular stator housing having a central axis and a radially inner surface;
(b) forming a stator insert body comprising a reinforcement structure and a plurality of voids in the reinforcement structure;
(c) attaching an elastomeric insert liner to a radially inner surface of the insert body;
(d) positioning the insert body in the housing; and
(e) removing the elastomeric liner from the insert body after (c) by pressurizing one or more of the plurality of voids.

14. The method of claim 13, wherein (b) comprises coupling a plurality of insert body segments together end-to-end to form the insert body.

15. The method of claim 14, wherein each pair of axially adjacent insert segments are connected with a locking assembly.

16. The method of claim 14, wherein (c) occurs before (d).

17. The method of claim 14, wherein (c) comprises attaching an elastomeric inert liner to the insert body after coupling the plurality of insert body segments together.

18. The method of claim 13, further comprising:
(e) mechanically locking the insert body to the housing.

19. The method of claim 18, wherein (e) comprises positively engaging a plurality of splines on a radially outer surface of the insert body with a plurality of mating grooves on the radially inner surface of the housing.

20. The method of claim 14, wherein (c) comprises:
(c1) positioning a core in a through bore in the insert body;
(c2) injecting an elastomeric material into an annulus formed radially between the insert body and the core;
(c3) allowing the elastomeric material to cure; and
(c4) removing the core from the through bore in the insert body.

21. The method of claim 13, wherein (c) comprises positively engaging a plurality of negative draft recesses on a radially inner surface of the insert body with the insert liner.

22. The method of claim 13, wherein (b) comprises forming the reinforcement structure by a stereolithography (STL) method.

23. The method of claim 13, wherein (b) comprises forming the reinforcement structure by direct metal laser sintering (DMLS).

24. A progressive cavity pump or motor, comprising:
a stator having a central axis and including a tubular housing and a stator insert coaxially disposed within the housing, wherein the stator insert includes an insert body and an insert liner attached to the insert body, the insert body being radially positioned between the housing and the insert liner;
wherein the insert body comprises a reinforcement structure defining a plurality of voids within the insert body;
wherein the reinforcement structure has radially inner surface comprising a plurality of elongated negative draft recesses, and wherein the insert liner extends radially into each of the negative draft recesses;

wherein each of the negative draft recesses has a circumferential width that increases moving radially outward from the radially inner surface of the reinforcement structure;

a rotor rotatably disposed within a helical-shaped throughbore extending axially through the stator and defined by the insert liner.

25. The progressive cavity pump or motor of claim 24, wherein the reinforcement structure has a radially outer cylindrical surface that engages the housing;
   wherein the reinforcement structure includes a plurality of circumferentially-spaced splines extending radially outward from the outer surface of the reinforcement structure;
   wherein each spline of the reinforcement structure extends radially into a mating elongate groove in a radially inner surface of the housing; and
   wherein positive engagement of the splines of the reinforcing structure and the grooves of the housing are configured to restrict the reinforcement structure from rotating relative to the housing.

26. The progressive cavity pump or motor of claim 24, wherein the housing has a radially inner cylindrical surface that engages the reinforcement structure;
   wherein the housing includes a plurality of circumferentially-spaced splines extending radially inward from the inner surface of the housing;
   wherein each spline of the housing extends radially into a mating elongate groove in a radially outer surface of the reinforcement structure;
   wherein positive engagement of the splines of the housing and the grooves of the reinforcement structure are configured to restrict the reinforcement structure from rotation relative to the housing.

27. The progressive cavity pump or motor of claim 24, wherein at least one of the voids is filled with a filler material selected from the group consisting of: air; nitrogen; water; a gelatinous substance (e.g., a polymer gel substance); metallic shavings, powders, fibers, and/or whiskers; ceramic powders; oxide powders; nitrite powders; graphite; silicon carbide; silicon nitrite; an aggregate; any dampening agent; and combinations thereof.

* * * * *